United States Patent [19]

Sundberg et al.

[11] Patent Number: 4,955,636
[45] Date of Patent: Sep. 11, 1990

[54] SAFETY INSTALLATION FOR CARRYING CHILDREN

[75] Inventors: Jukka Sundberg, Helsingfors; Bror Martin, Västerskog, both of Finland

[73] Assignee: Electrolux Autoliv AB, Stockholm, Sweden

[21] Appl. No.: 336,744

[22] Filed: Apr. 12, 1989

[30] Foreign Application Priority Data

May 6, 1988 [FI] Finland .................................. 882120

[51] Int. Cl.$^5$ ........................ B60N 1/12; B60R 21/06; B60R 22/10
[52] U.S. Cl. .......................................... 280/749; 5/94; 297/487
[58] Field of Search ............... 280/748, 749, 751, 727; 5/94, 118; 297/487, 488

[56] References Cited

U.S. PATENT DOCUMENTS

| | | | |
|---|---|---|---|
| 2,555,659 | 1/1951 | Rose | 5/94 |
| 3,003,164 | 10/1961 | Calvelage | 5/94 |
| 3,169,781 | 2/1965 | Abruzzino | 280/749 |
| 4,366,587 | 1/1983 | Takada | 5/94 |
| 4,481,685 | 11/1984 | Watson | 5/94 |

Primary Examiner—Charles A. Marmor
Assistant Examiner—Karin Tyson
Attorney, Agent, or Firm—Scully, Scott, Murphy & Presser

[57] ABSTRACT

A safety installation for carrying children in a vehicle. The safety installation comprises a framework to be fastened to a seat of the vehicle, a net structure attached thereto and fastening belts to connect the net structure to the framework. To insure that a carrying portion of a pram or the like to be arranged within the safety installation stay safely in place in case of sudden breakings, crashes, or the like, shock absorbing elements running parallel to the net structure are attached to the framework of the safety installation, the shock absorbing elements together with the fastening belts forming a firm holder for the carrying portion of the pram.

9 Claims, 1 Drawing Sheet

U.S. Patent     Sep. 11, 1990     4,955,636
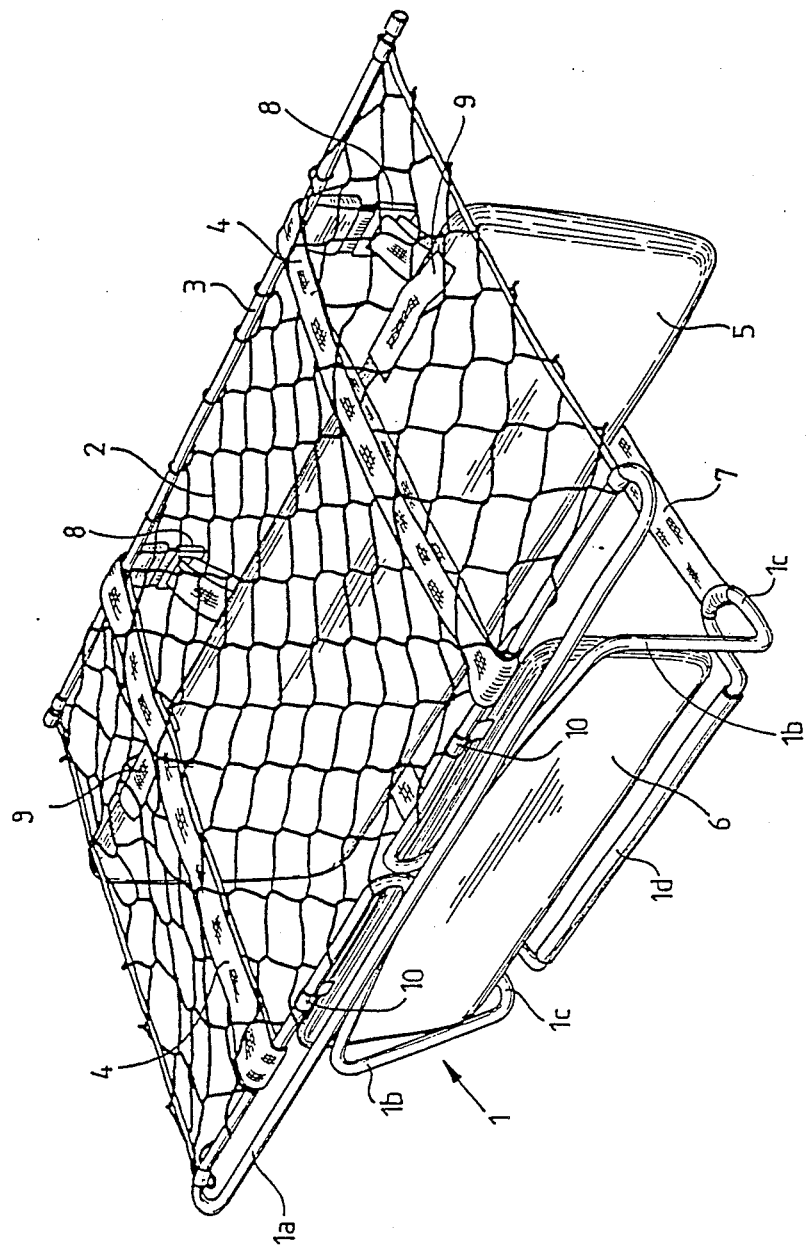

SAFETY INSTALLATION FOR CARRYING CHILDREN

BACKGROUND OF THE INVENTION

1. Field of the invention;

The present invention relates to safety installation for carrying children in a vehicle, which safety installation comprises a framework to be detachably fastened to a seat of the vehicle, a net structure connected at its first end to the framework, an edge portion arranged at the second end of the net structure, opposite to the framework, at least one connecting element for the connection of the net structure/the edge portion to the framework.

2. Discussion of the Prior Art

Carrying children in vehicles, as cars, always causes an extra risk factor. Children are small and lively, i.e. conventional safety belts intended for adults are not suitable for children. When a child is old enough to sit upright a longer time, it is possible to use safety cushions or seats existing on the market. Depending on the size of the child and on the design of the installation in question, it is possible to use either specific belts for this purpose or safety belts of the car for tying the child to the car seat.

However, such arrangements are not suitable for babies and for children which are only a little older. At this age a child should most preferably travel in a lying position, for instance in the carrying portion of a pram or the like, which naturally presupposes that the carrying portion is fastened to a car seat in an appropriate way.

Safety nets of various kinds are previously known. However, it has turned out that these nets are not effective in case of sudden brakings, crashes, drivings off the road or the like. The fact is that they yield in said situations, whereby the carrying portion of the pram, and so also the child, is thrown violently backwards, forwards or sidewards, which causes injuries.

Summary of the Invention

The object of the present invention is to provide a safety installation, by means of which said drawbacks are avoided and which is easy to be taken along and to be fastened to a seat of a car. This object is attained by means of a safety installation of the invention, which is characterized in that the framework is a framing, the upper edge of which forms an oblong loop essentially perpendicular to the level of the side edges of the framing, whereby the side edges in the vicinity of the upper edge, from the middle thereof, run essentially symmetrically outwards and thereafter make a sharp turn essentially symmetrically from the upper edge downwards and are joined through the lower edge of the framing, and that the upper edge of the framing is joined to the edge portion through at least one first shock absorbing element running parallel with the net structure.

The basic idea of the invention is to prevent by means of a structure as homogeneous as possible shock effects produced in connection with sudden brakings, crashes, drivings off the road and the like nearly irrespective of where the child is lying, i.e. irrespective of what is enclosed by the safety installation. Consequently, the child can be kept in the carrying portion of a pram or even in a carton without risking its security. The installation of the invention is additionally planned considering that it can be firmly fastened to a seat of a car alone by the aid of means available in practice, i.e. by a three-point safety belt. Moreover, the safety installation is presumed to fullfil the norms of the prevailing security regulations.

BRIEF DESCRIPTION OF THE DRAWING

One preferable embodiment of the invention is explained in the following with reference to the enclosed drawing illustrating a perspective view of the safety installation of the present invention.

DETAILED DESCRIPTION OF THE PREFERRED EMBODIMENT

The safety installation is shown diagonally from behind and in a position which it mainly has when it is tightened around the carrying portion of a pram or the like. A framework 1 is preferably formed by a framing manufactured of steel wire or the like. The upper edge of the framing 1 forms an oblong loop on a level essentially perpendicular to the level of side edges 1b of the framing. The loop, i.e. the upper edge of the framing, closes a longitudinal side, the purpose of which is to lean on the seat back of a car seat. Consequently, the framing is nearly perpendicular to the seat portion of the car seat. The other longitudinal side opens in the middle and changes to the two side edges 1b of the framing, which run symmetrically bending from the middle outwards while they, in the vicinity of the upper edge of the framing, are bent so as to form an essentially right angle with respect to the level of the upper edge. After having run some distance bent outwards, the side edges 1b turn sharply downwards and bend a little inwards towards the middle of the framing 1. The sharp turn occurs before the side edges reach the ends of the upper edge 1a. After this the lower ends of the side edges 1b are bent essentially rectangularly with respect to the level of the side edges outwards from the side edge level in the opposite direction with respect to the upper edge 1a of the framing and they form two U-shaped bends 1c joined together by an intermediate portion 1d at the lower edge of the framing. This intermediate portion between the U-shaped bends 1c is preferably detachable. This can best be realized in such a way that this portion is a pipe section a little bigger or smaller than the rest of the framing portion so that it can be slipped on the rest of the portion or pushed therein. The intention is that the U-shaped bends 1c are open against the seat back of the car seat and that connecting elements 7, 8 to be described in the following in closer detail are fastened thereto. Due to the detachable intermediate portion, said connecting elements formed by a belt 7 provided with a locking mechanism 8 can be conveniently slipped on the bends 1c.

In this way, a framework, i.e. a framing, has been provided, which can be firmly fastened to the seat back of a car seat by means of a three-point safety belt. A retraction of the side edges of the framing in the middle of the framing in the vicinity of its upper edge is suitable for a diagonal belt. The hip portion of the three-point belt is well supported by the lower portion of the side edges 1b of the framing, right above the U-shaped bends 1c, because the side edges bend in towards the middle of the framing. Such a design of the framing in connection with the fastening methods described makes the framing to absorb energy of a shock effect.

A net 2 manufactured of a preferably somewhat flexible material is fastened to the upper edge 1a of the framing 1, preferably to its open longitudinal side. At the other end of the net there is preferably an edge portion 3 also manufactured of a steel wire section. The free ends of the net can preferably be provided with an edge strip of rubber or the like. Two essentially parallel shock absorbing elements 4 run parallel with the net between the upper edge of the framing and the edge portion of the net. They are fastened to the upper edge 1a of the framing 1 approximately in line with those portions of the side edges 1b of the framing which run downwards. As material is used e.g. polyester fibre, i.e. the same material as is used for safety belts. The connecting elements 7, 8 can form a direct extension of the shock absorbing elements or they can be fastened individually to the edge portion 3 or to the U-shaped bends 1c of the lower portion 1d of the framing. Each of them is preferably formed by a belt 7 with an adjustable length known per se provided with a locking mechanism 8.

Consequently, as described above, a safety installation has been provided, which can be fastened firmly to a car seat. Its circumference can be varied by means of belts with adjustable length so that it always gives a sure and safe protection nearly irrespective of what is enclosed by the installation, i.e. irrespective of where the child is positioned.

To guarantee an even more effective shock absorption, the safety installation is provided with a second and a third shock absorbing element 5 and 6, each of them consisting of a padded plate in the form of a cushion. The second shock absorbing element 5 is suspended from the first shock absorbing elements 4 and/or the net structure 2 preferably by detachable fasteners 9. The intention is that this plate is positioned inside the carrying portion of a pram in the direction of motion of the car. Its function is to weaken the shocks when the child is thrown forwards. The third shock absorbing element 6 is fastened for instance by suspending from the upper edge 1a of the framing 1 so that it is positioned between the framing as at detachable fasteners 10, and the carrying portion of the pram. Its function is to weaken the shocks when the child is thrown backwards, for instance due to a rear-end collision.

The intention of the drawing and the specification attached thereto is only to clarify the basic idea of the invention. Concerning the details, the installation of the invention can vary within the scope of the enclosed claims.

We claim:

1. A safety installation for carrying children in a vehicle, which safety installation comprises:
    a framework to be detachable fastened to seat of the vehicle,
    a net structure connected at its first end to the framework,
    an edge portion arranged at a second end of the net structure and connected to said net structure, opposite to the framework,
    at least one connecting element for connecting the the edge portion to the framework,
    wherein the framework is a framing, an upper edge of which forms an oblong loop on a plane essentially perpendicular to a plane of side edges of the framing, whereby the side edges in the vicinity of the upper edge, from the middle thereof, run essentially symmetrically outwards and thereafter make a sharp turn essentially symmetrically from the upper edge downwards and are joined through a lower edge of the framing, and that
    the upper edge of the framing is joined to the edge portion through at least one first shock absorbing element running parallel with the net structure.

2. A safety installation according to claim 1, further comprising two first shock absorbing elements running parallel with the net structure.

3. A safety installation according to claim 1 or 2, wherein the first shock absorbing element is a belt, preferably of polyester fibre.

4. A safety installation according to claim 1 or 2, wherein the first shock absorbing element and/or the net structure is detachably fastened to a second shock absorbing element 5. A safety installation according to claim 4, wherein the second shock absorbing element is a padded plate.

6. A safety installation according to claim 1, wherein the framing is detachably fastened to a third shock absorbing element.

7. A safety installation according to claim 6, wherein the third shock absorbing element is a padded cushion.

8. A safety installation according to claim 1, wherein the connecting element is formed by a belt portion with an adjustable length and by a lock portion attached thereto.

9. A safety installation according to claim 8, wherein the connecting element is formed by a conventional safety belt provided with a locking mechanism.

* * * * *

UNITED STATES PATENT AND TRADEMARK OFFICE
CERTIFICATE OF CORRECTION

PATENT NO. : 4,955,636

DATED : September 11, 1990

INVENTOR(S) : Jukka Sundberg, et al.

It is certified that error appears in the above-identified patent and that said Letters Patent is hereby corrected as shown below:

On the title page:

In the Abstract, lines 7-8: "breakings" should read as --brakings

Column 1, line 7: after "to" insert --a--

Column 2, line 3: "fullfil" should read as --fulfill--

Column 3, line 34: "fasterners" should read as --fasteners--

Column 3, line 40: after "framing 1" insert --as detachable fasteners 10,--

Column 3, line 41: after "framing" delete --as at detachable fasterners 10,--

Column 4, line 12, Claim 1: before "edge" delete --the--

Signed and Sealed this

Seventh Day of January, 1992

*Attest:*

HARRY F. MANBECK, JR.

*Attesting Officer*     *Commissioner of Patents and Trademarks*